United States Patent [19]
Govoni et al.

[11] Patent Number: 5,236,962
[45] Date of Patent: Aug. 17, 1993

[54] CRYSTALLINE PROPYLENE POLYMERS AND COPOLYMERS IN THE FORM OF SPHERICAL PARTICLES AT HIGH POROSITY

[75] Inventors: Gabriele Govoni, Renazzo; Mario Sacchetti; Antonio Ciarrocchi, both of Ferrara, all of Italy

[73] Assignee: Himont Incorporated, Wilmington, Del.

[21] Appl. No.: 929,470

[22] Filed: Aug. 13, 1992

Related U.S. Application Data

[63] Continuation of Ser. No. 727,321, Jul. 2, 1991, abandoned, which is a continuation of Ser. No. 515,300, Apr. 27, 1990, abandoned.

[30] Foreign Application Priority Data

Apr. 28, 1989 [IT] Italy ............................... 20327 A/89

[51] Int. Cl.$^5$ .......................... C08C 19/22; C08F 8/34
[52] U.S. Cl. .......................................... 521/56; 521/60; 521/142; 521/143; 521/134; 526/125; 526/351
[58] Field of Search ................... 521/56, 60, 142, 143, 521/134; 526/125, 351

[56] References Cited

U.S. PATENT DOCUMENTS

| | | | |
|---|---|---|---|
| 3,655,542 | 4/1972 | Tamai et al. | 521/143 |
| 3,812,224 | 5/1974 | Smith et al. | 521/139 |
| 3,953,414 | 4/1976 | Galli et al. | 252/429 CX |
| 3,962,157 | 6/1976 | Nakano et al. | 521/134 |
| 4,247,498 | 11/1978 | Castro et al. | 264/41 |
| 4,298,706 | 11/1981 | Takashi et al. | 521/908 |
| 4,399,054 | 8/1983 | Ferraris et al. | 526/125 |
| 4,433,073 | 2/1984 | Sano et al. | 523/201 |
| 4,451,589 | 5/1984 | Morman et al. | 523/124 |
| 4,548,915 | 10/1985 | Goodall et al. | 526/125 |
| 4,705,818 | 10/1987 | Kawai et al. | 523/200 |

FOREIGN PATENT DOCUMENTS 0290149 4/1988 European Pat. Off. .
58-17139 2/1983 Japan .

*Primary Examiner*—Morton Foelak

[57] ABSTRACT

Crystalline polymers and copolymers of propylene in the form of spherical particles having a porosity (expressed in percentage of voids) greater than 15%. These polymers are useful in the preparation of masterbatch containing significant quantities of additives and/or pigments.

4 Claims, No Drawings

CRYSTALLINE PROPYLENE POLYMERS AND COPOLYMERS IN THE FORM OF SPHERICAL PARTICLES AT HIGH POROSITY

This application is a continuation of application Ser. No. 07/727,321, filed Jul. 2, 1991, now abandoned, which is a continuation of application Ser. No. 07/515,300, filed Apr. 27, 1990, now abandoned.

This invention refers to crystalline polymers and copolymers of propylene in the form of spherical particles with an average diameter from 50 and 7000 microns and porosity and surface area characteristics which make them suitable for the preparation of masterbatch containing significant quantities of pigment and/or additives.

It is known that catalyst components for the polymerization of olefins comprising a titanium compound supported on a magnesium halide in active form can be obtained in spherical particle form suitable for the manufacture of polymers with optimum morphological characteristics. Components of this type are described in U.S. Pat. Nos. 3,953,414 and 4,399,054. Specifically, the polymers obtained with the catalysts of U.S. Pat. No. 4,399,054 are in spherical particle form having high flowability and bulk density values. The porosity (about 10% expressed in percentage of voids), including the pore volume distribution, and the surface area, however, are not sufficiently high to allow the preparations of masterbatches containing a significant quantity of pigments and/or additives.

Now it has been found that it is possible to obtain homopolymer polypropylene with an isotactic index greater than 90, and crystalline copolymers of propylene with ethylene or a $CH_2=CHR$ olefin or mixtures thereof where R is an alkyl radical with 2-8 carbon atoms which contain more than 85% by weight of propylene and have an isotactic index greater than 85, in a spherical particle form having an average diameter from 50 to 7000 microns, a porosity, expressed in percentage of voids, greater than 15%, preferably between 15 and 30%. The pore volume distribution is such that more than 90% of the pores have a diameter greater than 10,000 Å. Preferably the propylene content in the copolymer is from 90 to 98% by weight of propylene.

For example, the polymers of this invention typically have the following properties:
porosity = 15-30%;
particle size distribution = 100% of the particles have a diameter from 1000 to 3000 microns: in particular 40 to 50% of the particles have a diameter from 1000 to 2000 microns, and 35 to 45% from 2000 to 3000 microns.

The polymers of this invention are particularly suitable to the preparation of masterbatch containing significant quantities of additives and/or pigments.

The catalysts used in the preparation of polymers are obtained from catalyst components having particular morphological properties and having a titanium halide or halogen alcoholate and an electron donor compound supported on magnesium chloride.

The catalytic components are obtained from adducts of magnesium chloride with alcohols containing generally 3 moles of alcohol per mole of $MgCl_2$, which are prepared by emulsifying, in the molten state, the adduct in an inert hydrocarbon liquid immiscible with the melted adduct, then cooling the emulsion very rapidly in order to cause the solidification of the adduct in the form of spherical particles. The resultant particles are then subjected to partial dealcoholation using a heating cycle at temperature increasing from 50° to 130° C. until the alcohol content is decreased from 3 to about 0.5-1.5 moles per mole of $MgCl_2$.

The adduct thus obtained is suspended cold in $TiCl_4$, at a concentration of 40-50 g/l, and then brought to a temperature of 80° to 135° C. where it is maintained for 1-2 hours. To this $TiCl_4$ is also added an electron-donor compound. Preferable electron donor include mono or disubstituted phthalates wherein the substituents is a linear or branched $C_{1-10}$ alkyl, $C_{3-8}$ cycloalkyl, or aryl radical, such as for instance diisobutyl, di-n-butyl, and di-n-octyl phthalate. The excess $TiCl_4$ is then removed hot through filtration or sedimentation, and the treatment with $TiCl_4$ is repeated one or more times. The resulting solid is then washed with heptane or hexane and then dried. The characteristics of the catalyst component thus obtained in this manner are as follows:

surface area = less than 100 $m^2/g$, preferably between 60 and 80 $m^2/g$;
porosity (nitrogen) = 0.25-0.35 cc/g;
pore volume distribution = more than 50% of the pores have a radius greater than 100 Å.

The catalyst is obtained by mixing the solid catalyst component with (1) an aluminum trialkyl compound, preferably aluminum triethyl or aluminum triisobutyl, and (2) an electron donor compound. The electron donor is preferably a silane compound of the formula $R'R''Si(OR)_2$ wherein $R'$ and $R''$ may be the same or different and are $C_{1-8}$ linear or branched alkyl, $C_{3-8}$ cycloalkyl, or $C_{6-20}$ substituted and unsubstituted aryl radicals, and R is a $C_{1-4}$ alkyl radical, preferably linear. Typically the aryl radical, if substituted, is substituted with a $C_{1-4}$ linear or branched alkyl radical.

Other silane compounds, such as phenyltriethoxysilane can also be used.

Typical silane compounds are diphenyldimethoxysilane, dicyclohexyldimethoxysilane, methyl-t-butyldimethoxysilane, and diisopropyldimethoxysilane.

The Al/Ti ratio is generally from 10 to 800 and the molar silane/Al ratio is typically from 1/5 to 1/50.

The polymerization of propylene is done according to known techniques operating in liquid monomer or gas phase. The polymerization temperature is preferably from 70° to 90° C.

The catalysts can be precontacted with small quantities of olefin (prepolymerization), maintaining the catalyst in suspension in a hydrocarbon solvent, polymerizing at a temperature between room temperature and 60° C. for a time sufficient to produce quantities of polymer from 0.5 to 3 times the weight of the catalyst. Prepolymerization in a monomer liquid can also be done, producing in this case quantities of polymer up to 1000 times the weight of the catalyst.

The preparation of the masterbatch from the polymers of this invention may be done according to known techniques. One of these comprises treating the polymer with a solution or emulsion of the additive (e.g. pigment) in a solvent so that the additive is absorbed by the polymer, and then evaporating the solvent. The quantity of additive which remains incorporated depends on the concentration of the additive the solution or emulsion. Another method comprises causing the absorption of the additive or mixtures of additives in the melted form. Using these methods it is possible to incorporate quantities of additives about 10-15% by weight in case of solutions or emulsions, and about 20-30% by weight in case of absorption from melt. The corresponding quantities in the case of known or commercially available porous polymers with the above two known techniques do not exceed 2 and 4%, respectively.

According to another method, the additive and/or pigment is dispersed in a low-melting molten wax. The dispersion is then mixed with the polymer in such quantity as to obtain a coating of the same with the pigment and/or additive dispersed in the wax phase. Using this method it is possible to incorporate quantities of additives/pigments of about 20 to 25% by weight.

The additives that can be used are those normally added to polymers in order to give the latter particular properties. Hence, they include stabilizers, pigments, titanium oxide, ferrous oxide, phthalocyanine, and the like.

The data reported in this specification relative to the following properties have been determined as indicated below:

| Property | Method |
| --- | --- |
| MIL Flowability index | ASTM-D 1238 |
| Fraction soluble in xylene | (see below) |
| Isotactic index | Percent by weight in polymer insoluble in xylene at room temperature (25° C.) (basically equal to the % by weight of polymer insoluble in boiling n-heptane). |
| Surface area | B.E.T. (Sorptomatic 1800 apparatus - C. Erba). |
| Porosity (nitrogen) | B.E.T. (see above) |
| Bulk density | DIN-53194 |
| Flowability | The time needed for 100 g of polymer to flow through a funnel with an outlet oriface of 1.27 cm in diameter and whose walls are inclined at 20° angle on the vertical. |
| Morphology | ASTM-D 1921-63 |

The porosity expressed as percentage of voids is determined through adsorption of mercury under pressure. The volume of mercury absorbed corresponds to the volume of the pores. In order to determine this, a dilatometer with calibrated probe (3 mm diam.) C D3 (C. Erba) connected to a mercury reservoir and a hard vacuum rotating pump ($1 \times 10^{-2}$ mba) is used.

A weighed quantity of the sample (about 0.5 g) is introduced into the dilatometer. The apparatus is then brought under vacuum (<0.1 mm Hg) and one waits for 10 minutes. The dilatometer is then connected to the mercury reservoir and the liquid mercury metal is allowed to flow into the dilatometer slowly until it reaches the level marked on the probe at a height of 10 cm. The valve that connects the dilatometer to the vacuum pump is closed and the apparatus is pressurized with nitrogen (2.5 kg/cm$^2$). The pressure causes the mercury to penetrate the pores and the level of mercury lowers according to the porosity of the material. The lower the level the greater the porosity of the material. Once the measure on the probe where the new mercury level has stabilized is determined, the volume of the pores is calculated as follows: $V = R^2 \pi \Delta H$ where R is the radius of the probe in cm; $\Delta H$ is the difference in cm between the initial and final levels of the mercury column.

The volume of the sample is calculated using the equation:

$$V1 = \frac{P1 - (P2 - P)}{D}$$

where P is the weight of the sample in grams, P1 is the weight in grams of the dilatometer+mercury, P2 is the weight in grams of the dilatometer+mercury+sample and D is the density of the mercury (at 25° C.=13.546 g/cc).

The porosity percentage is calculated using the following equation:

$$X = \frac{100 \cdot V}{V1}$$

The fraction of polymer soluble in xylene at room temperature is determined as follows: 2 g of polymers are dissolved in 250 ml of xylene at 135° C. under agitation. After 20 minutes the solution is cooled to 25° C., always with agitation, and then left to stand for 30 minutes. The precipitate thus formed is filtered through a paper filter; the solution is then evaporated under a nitrogen stream or blanket; and the residue is dried under vacuum at 80° C. until constant weight is reached. Thus is calculated the percentage by weight of polymer soluble in xylene at room temperature.

The following examples illustrate the specific embodiments of the instant invention. Unless otherwise specified all parts and percentages in this application are by weight.

EXAMPLE 1

A MgCl$_2$.3C$_2$H$_5$OH adduct in spherical particle form which particles have a diameter from 30 to 150 microns is prepared following the method described in Example 2 of U.S. Pat. No. 4,399,054, the disclosures of said method being incorporated herein by reference, operating at 5,000 rpm instead of 10,000 rpm. The resultant adduct is then dealcoholated by heating with temperatures increasing from 50° to 100° C. under a nitrogen stream until the alcohol content reaches 1.5 moles for each mole MgCl$_2$. The adduct thus obtained has a surface area of 9.1 m$^2$/g and apparent density of 0.564 g/cc.

25 g of said adduct are added in a reaction vessel under agitation at 0° C. to 625 ml of TiCl$_4$. The contents of the vessel are then heated to 100° C. in 1 hour. When the temperature reached 40° C., diisobutylphthalate is added in molar ratio Mg/diisobutylphtalate (DIBP)=8. The contents of the vessel are then heated to 100° C. for 2 hours, left to settle and subsequently the liquid is syphoned off hot. 550 ml of TiCl$_4$ are added the solid and the contents of the vessel heated to 120° C. for 1 hr, the reaction mixture is then left to settle and the liquid is syphoned off hot. The resulting solid is washed 6 times with 200 ml aliquots of anhydrous hexane at 60° C. and then 3 times at room temperature. The solid catalyst component, after drying under vacuum, has the following characteristics:

porosity (nitrogen)=0,389 cc/g;
surface area=221 m$^2$/g;
bulk density=0.555 g/cc Using 0.01 g of this solid, a propylene polymerization is conducted in a 4 l autoclave equipped with an agitator and a thermostatic system, previously flushed with nitrogen at 70° C. for 1 hour and then with propylene. Into the thus prepared autoclave at 30° C., without agitation but under a propylene stream, is introduced a catalyst system consisting of a suspension of the solid catalyst component in 80 ml of hexane, 0.76 g of triethylaluminum, and 8.1 mg of diphenyldimethoxysilane, which system is prepared just prior to its use in the polymerization test. The autoclave is then closed and 1 Nl of hydrogen is introduced. While agitating, 1.2 kg of liquid propylene are charged and the temperature is brought to 70° C. in five minutes, maintaining the value constant for 2 hours. At the end of the test, the agitation is stopped and the non-reacted propylene is removed. After cooling the autoclave to room temperature, the polymer is recovered and then dried at 70° C. under a nitrogen stream in an oven for 3 hours. 378 g of polymer is obtained having the following characteristics:

fraction soluble in xylene = 2.6%
MIL = 2.8 g/10'
bulk density = 0.375 g/cc
void percentage = 16%

EXAMPLE 2

The alcohol is removed from a $MgCl_2.3C_2H_5OH$ adduct obtained according to the procedure of Example 1 until a $MgCl_2/C_2H_5OH$ ratio of 1 is obtained. The adduct thus obtained has a surface area of 11.5 $m^2$ and a bulk density of 0.535 g/cc. From this adduct, after treatment according to the procedure and ingredients of Example 1, a catalyst component in spherical particle form is obtained which has the following characteristics:

Ti = 2.2% weight
DIBP = 6.8% weight
surface area = 66.5 $m^2/g$
porosity (nitrogen) = 0.261 cc/g
bulk density = 0.440 g/cc.

Using 0.023 g of this catalyst component in the polymerization of propylene according to the procedure of Example 1, 412 g of polymer are obtained having the following characteristics:

fraction soluble in xylene = 3%
MIL = 2 g/10'
bulk density = 0.35 g/cc
void percentage = 23.5%
morphology = 100% spherical particles with a diameter between 500 and 5000 microns
flowability = 12 sec.

EXAMPLE 3

20 kg of polypropylene in spherical particle form obtained with a continuous propylene polymerization test using a catalyst obtained from solid catalyst component and cocatalyst components of Example 2, are introduced into a Loedige FM 130 P mixer lined with vapor at 120° C. and mixed for 5 minutes at a blade speed of 150 rpm until the temperature of the polymer reaches 70° C. 5 kg of Atmer 163 (Atlas) are then sprayed into the mixer at 120° C. The agitation is continued for 15 minutes and then the product is discharged. The polymer thus obtained is in the form of spherical particles with 100% of the particles having a diameter from 1000 to 5000 microns which particles contain 19.8% by weight of ATMER and have a flowability of 13 sec.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. Crystalline propylene homopolymers with an isotactic index greater than 90 and crystalline copolymers of propylene with ethylene or a $CH_2=CHR$ olefin or mixtures thereof containing over 85% by weight of propylene and having an isotactic index greater than 85, where R is an alkyl radical with 2-8 carbon atoms, said homopolymers and copolymers being in the form of spherical particles having an average diameter of from 50 to 5000 microns, a porosity, expressed in void percentage, greater than 15%, and a pore volume distribution such that more than 90% of the pores have a diameter greater than one micron.

2. Propylene polymers and copolymers of claim 1 wherein the void percentage is from 20 to 30%.

3. A masterbatch comprising the homopolymers and copolymers of claim 1 in particulate form having incorporated therein an additive or pigment or mixtures thereof.

4. A masterbatch comprising the homopolymers and copolymers of claim 2 in particulate form having incorporated therein an additive or pigment or mixtures thereof.

* * * * *